J. C. BERGH.
PLOW ATTACHMENT.
APPLICATION FILED MAR. 9, 1911.
1,042,386.
Patented Oct. 29, 1912.
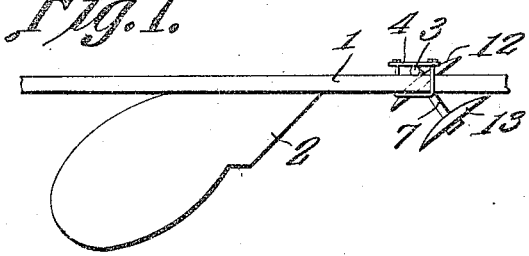
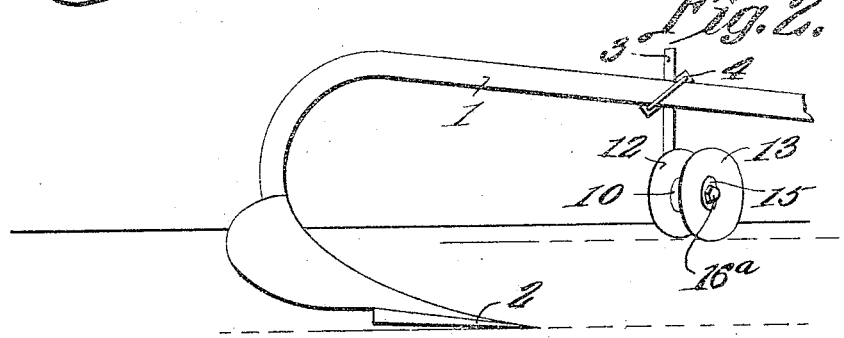
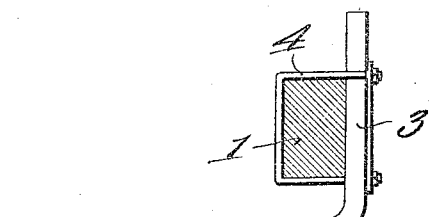
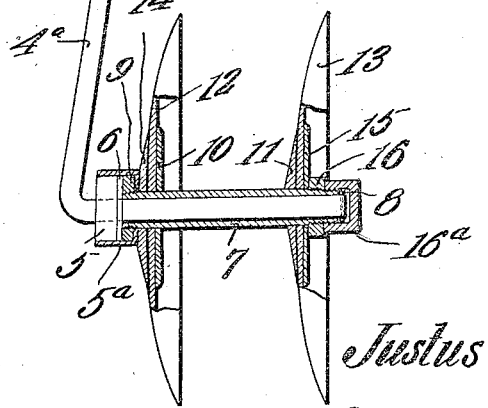
Justus C. Bergh,
Inventor
Witnesses
by
Attorneys

UNITED STATES PATENT OFFICE.

JUSTUS C. BERGH, OF HENDRUM, MINNESOTA.

PLOW ATTACHMENT.

1,042,386.   Specification of Letters Patent.   Patented Oct. 29, 1912.

Application filed March 9, 1911. Serial No. 613,232.

*To all whom it may concern:*

Be it known that I, JUSTUS C. BERGH, a citizen of the United States, residing at Hendrum, in the county of Norman and State of Minnesota, have invented a new and useful Plow Attachment, of which the following is a specification.

This invention has relation to plow attachments and consists in the novel construction and arrangement of its parts as hereinafter described and claimed.

The object of the invention is to provide a plow attachment of simple and durable structure adapted to be applied to the beam of a breaking plow in advance of the share and adapted to operate upon and stir the top surface of the soil just before the furrow slice is turned by the share. By such an arrangement the stubble or trash at the surface of the soil is mixed with the top soil and when the furrow slice is turned the said slice will fit snugly in the subsoil and air spaces usually found between the furrow slice and the sub-soil will be reduced in number and dimensions. Therefore after the soil has been plowed the top soil will be in close contact with the sub-soil which will conserve the moisture in the sub-soil so that it may be taken up by capillary attraction by the top soil.

In the accompanying drawings: Figure 1 is a top plan view of a breaking plow with the attachment applied. Fig. 2 is a side elevation of the attachment with parts in section. Fig. 3 is a detail view of the attachment with parts in section.

As hereinbefore stated the attachment is adapted to be applied to a break plow and as shown in the drawings such a plow consists of a beam 1 and a share 2. The attachment is applied to the beam 1 just in advance of the share 2. An arm 3 is adapted to be secured to the side of the beam 1 by a suitable clamp device as that illustrated at 4. The arm 3 is formed with its end portions at a right angle to each other the upper end portion of the said arm being located in a plane midway between the ends of the lower portion of the arm. The part of the said arm between the upper and lower extremities thereof is bent or bowed to one side as at 4ª. A stop 5 is fixed to the lower portion of the arm 3 and a washer 6 of soft metal is mounted upon the lower portion of the arm 3 against one of the faces of the stop 5.

A sleeve 7 is journaled upon the lower portion of the arm 3 and one end bears against the face of the washer 6. A pin 8 is passed transversely through the outer end portion of the lower part of the arm 3 and serves as means for holding the sleeve 7 upon the said portion of the said arm. A nut 9 is screwed upon the inner end of the sleeve 7 and is surrounded by a jacket 5ª which also surrounds the stop 5 and washer 6. Stop plates 10 and 11 are fixed to the intermediate portions of the sleeve 7 and are spaced from each other. A gang of disks 12 and 13 is mounted upon the sleeve 7 and these disks bear against the sides of the stops 10 and 11 respectively. A washer plate 14 is interposed between the jacket 5ª and the disk 12 and the said nut serves as means for clamping the disk 12 between the plates 10 and 14. A washer plate 15 bears against the outer face of the disk 13 and a nut 16 screwed upon the outer end of the sleeve 7 serves as means for clamping the disk 13 between the plates 11 and 15. A cap 16ª is screwed upon the outer end of the sleeve 7 and incloses the pin 8 and the extremity of the lower end portion of the arm 3. When the attachment is applied to a plow the lower portion of the arm 3 is disposed at an angle to the longitudinal dimension of the plow beam 1 and to the line of draft of the plow and the lower edges of the disks 12 and 13 are at a higher elevation than the edge of the share 2. Consequently the disks 12 will operate in the top soil in advance of the share 2 and inasmuch as the edges of the said disks will lie in planes at an angle to the line of draft the said disks will rotate and cut the material at the top soil. By reason of the fact that the lower portion of the arm 3 and the disks carried thereby are disposed as indicated there will be thrust strain along the sleeve 7 but the said sleeve will have its rear end bearing against the soft metal washer 6 located against the face of the stop 5 and therefore it will be braced in its position upon the lower portion of the arm 3. The cap 16ª will prevent the entrance of sand or other foreign material between the sleeve and that portion of the arm 3 upon which it is journaled.

It will be apparent, by referring to Fig. 3, that the disks 12 and 13 are located at opposite sides of the longitudinal axis of the upper end portion 3 so that, when the device is in use, the pressure against the disks will be equalized at opposite sides of said axis and the tendency of the attachment to twist or turn is thus reduced to the minimum. As a result, very simple means can be utilized for attaching the device to the beam 1 as it is not necessary to provide any special type of fastening to prevent twisting or rotation of the part 3.

Having described the invention what I claim as new and desire to secure by Letters Patent is:

A plow attachment including an arm, a stop thereon, a sleeve mounted for rotation upon the arm, stop plates fixed on the sleeve, disks on the sleeve between the stop plates and the respective ends of the sleeve, washer plates interposed between the disks and the adjacent ends of the sleeve, nuts engaging the ends of the sleeve for binding the washer plates upon the disks and binding said disks against the stop plates, a wear device interposed between the sleeve and the stop, means extending transversely through the arm for holding the sleeve against said wear device, a cap detachably engaging the sleeve for housing said holding means, and a jacket engaging the stop and extending around the nut on one end of the sleeve.

In testimony that I claim the foregoing as my own, I have hereto affixed my signature in the presence of two witnesses.

JUSTUS C. BERGH.

Witnesses:
H. ORLANDO ENGEBRETSON,
A. H. GORDON.

Copies of this patent may be obtained for five cents each, by addressing the "Commissioner of Patents, Washington, D. C."